US008630278B2

(12) United States Patent
Seo et al.

(10) Patent No.: US 8,630,278 B2
(45) Date of Patent: Jan. 14, 2014

(54) DIGITAL BROADCASTING SIGNAL TRANSMITTING METHOD AND DEVICE, RECORDING MEDIUM THEREOF, AND RECEIVING DEVICE THEREOF

(75) Inventors: Jae Hyun Seo, Daejeon (KR); Hyoung Soo Lim, Daejeon (KR); Heung Mook Kim, Daejeon (KR); Yong Tae Lee, Daejeon (KR); Sung Ik Park, Daejeon (KR); Jong Soo Lim, Daejeon (KR); Soo In Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 169 days.

(21) Appl. No.: 12/682,796

(22) PCT Filed: Aug. 4, 2008

(86) PCT No.: PCT/KR2008/004528
§ 371 (c)(1),
(2), (4) Date: Apr. 13, 2010

(87) PCT Pub. No.: WO2009/054603
PCT Pub. Date: Apr. 30, 2009

(65) Prior Publication Data
US 2010/0220720 A1    Sep. 2, 2010

(30) Foreign Application Priority Data
Oct. 26, 2007  (KR) .................. 10-2007-0108349

(51) Int. Cl.
*H04J 1/00* (2006.01)
*H04J 4/00* (2006.01)
*G06F 15/16* (2006.01)

(52) U.S. Cl.
USPC ............ 370/339; 370/343; 370/436; 709/231

(58) Field of Classification Search
USPC ................ 370/208–210, 330–389, 436–470; 375/298–344; 709/231–236
See application file for complete search history.

(56) References Cited

U.S. PATENT DOCUMENTS 5,416,801 A * 5/1995 Chouly et al. ................ 375/260
7,058,005 B2 * 6/2006 Ehrmann-Patin et al. .... 370/208
(Continued)

FOREIGN PATENT DOCUMENTS

| EP | 1 841 106 A2 | 10/2007 |
| JP | 2002-198929 A | 7/2002 |
| KR | 1020020048409 A | 6/2002 |

(Continued)

OTHER PUBLICATIONS

European Telecommunication Standard; "Radio broadcasting systems; Digital Audio Broadcasting (DAB) to mobile, portable and fixed receivers", European Broadcasting Union, Reference DE/JTC-DAB, ETS 300 401, XP000668972, Feb. 1995, 206 pages.
International Search Report PCT/KR2008/004528, Feb. 16, 2009.

*Primary Examiner* — Man Phan
(74) *Attorney, Agent, or Firm* — Ladas & Parry LLP

(57) ABSTRACT

In a digital broadcasting signal transmission system, a transmission frame includes a frame body and a frame header, and the frame body is divided into a plurality of sub-bands in the frequency domain and is divided into a plurality of symbols in the time domain. The frame header is provided in the former part of the transmission frame and is transmitted with a signal in the time domain. The frame body includes a plurality of services, and the services respectively receive at least one sub-band and at least one symbol. The frame header includes information on the plurality of services, and information on the plurality of services includes information on the sub-band and the symbol to which the services are allocated, information on channel encoding levels of the services, and information on digital modulation levels of the services.

3 Claims, 6 Drawing Sheets

(56) References Cited

U.S. PATENT DOCUMENTS

| | | |
|---|---|---|
| 7,386,072 B2 * | 6/2008 | Uno .............................. 375/344 |
| 8,023,488 B2 * | 9/2011 | Murakami et al. ............ 370/343 |
| 8,089,945 B2 * | 1/2012 | Murakami et al. ............ 370/343 |
| 2002/0085486 A1 | 7/2002 | Ehrmann-Patin et al. |
| 2006/0248563 A1 * | 11/2006 | Lee et al. ...................... 725/117 |
| 2006/0262744 A1 | 11/2006 | Xu et al. |
| 2007/0047432 A1 * | 3/2007 | Cho et al. ...................... 370/203 |

FOREIGN PATENT DOCUMENTS

| | | |
|---|---|---|
| KR | 1020060112159 A | 10/2006 |
| KR | 1020070027948 A | 3/2007 |
| WO | 01/20865 A1 | 3/2001 |
| WO | 2005/122458 A1 | 12/2005 |

* cited by examiner

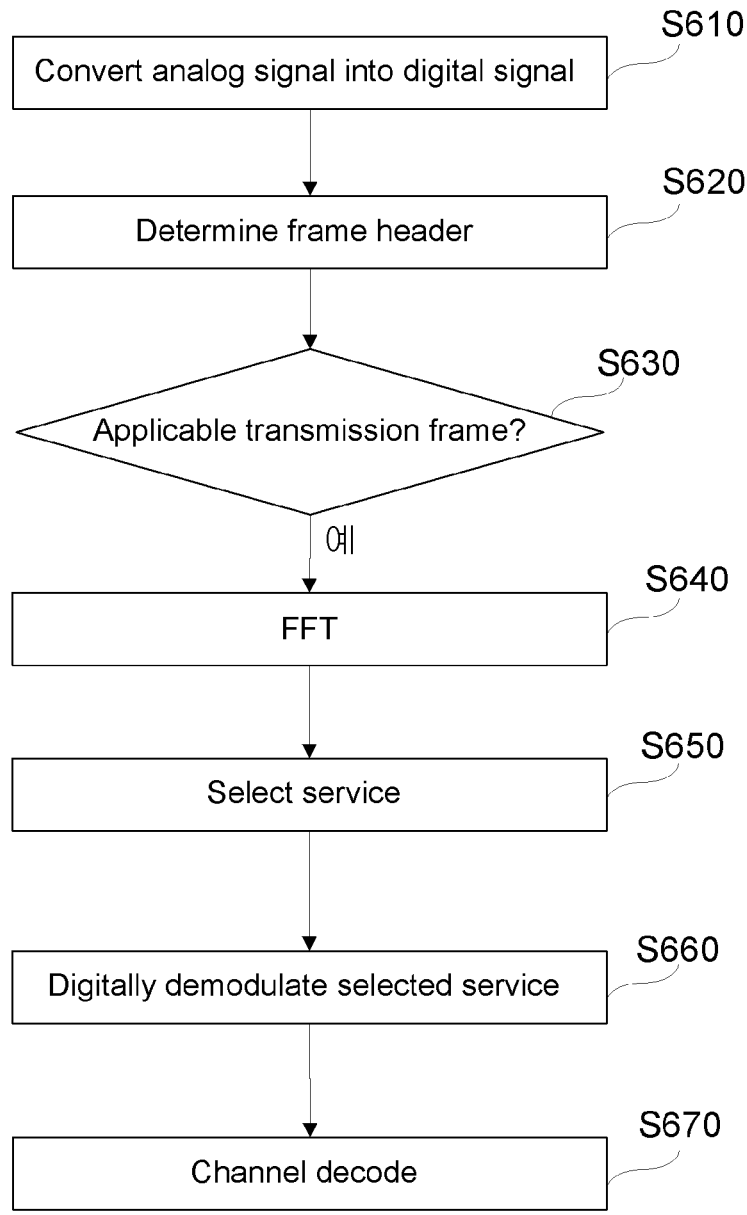

DIGITAL BROADCASTING SIGNAL TRANSMITTING METHOD AND DEVICE, RECORDING MEDIUM THEREOF, AND RECEIVING DEVICE THEREOF

TECHNICAL FIELD

The present invention relates to a digital broadcasting signal transmitting method and device, a recording medium thereof, and a receiving device thereof. Particularly, the present invention relates to a method and device for transmitting digital broadcasting signals for transmitting a plurality of services that are multiplexed in the time domain and the frequency domain to a transmission frame in different transmission formats, a recording medium thereof, and a receiving device thereof.

This work was supported by the IT R&D program of MIC/IITA [2006-S-016-02, Development of Distributed Translator Technology for Terrestrial DTV].

BACKGROUND ART

A general digital broadcasting transmission system provides various transmission formats since it can select various transmission modes, modulation levels, layer modulation, and error correction codes. In this instance, since a transmission mode, a modulation level, layer modulation, and error correction codes can be selected for a random radio frequency (RF) channel, a different mode, a modulation level, layer modulation, and error correction codes can be selected depending on the RF channel.

However, since all the transmission frames that are transmitted through a random RF channel commonly use the transmission mode, modulation level, layer modulation, and error correction codes that are determined according to the corresponding RF channel, the transmission frames of the corresponding RF channel problematically have transmission formats that are the same with respect to time.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a method and device for transmitting digital broadcasting signals for providing different transmission formats according to the frequency domain and the time domain, a recording medium, and a receiving device thereof.

Technical Solution

An exemplary embodiment of the present invention provides a broadcasting signal transmission method for providing a plurality of services by outputting a frame including: allocating at least one sub-band of the frame to the plurality of services; allocating at least one symbol section of the frame to the plurality of services; converting the frame into a frame in the time domain; generating a frame header in the time domain including information on the plurality of services; and inserting the frame header into the frame in the time domain.

Information on the plurality of services includes information on the sub-band and symbol section allocated to the plurality of services. The method further includes channel encoding the plurality of services, and information on the plurality of services further includes information on the respective channel encoding levels of the plurality of services.

The method further includes performing digital modulation on the plurality of services, and information on the plurality of services further includes information on the respective modulation levels of the plurality of services.

Another embodiment of the present invention provides a computer readable recording medium for recording a program for realizing the broadcasting signal transmission method in a computer.

Yet another embodiment of the present invention provides a broadcasting signal transmitting device for providing a plurality of services by outputting a frame including: an allocator for allocating at least one sub-band of the frame and at least one symbol section of the frame corresponding to the plurality of services; an inverse fast Fourier transform unit for converting the frame into a frame in the time domain; and a frame generator for generating a frame header in the time domain including information on the plurality of services, and inserting the frame header into the frame in the time domain.

Information on the plurality of services includes information on the sub-band and the symbol section of the frame to which the services are allocated. The device further includes: a plurality of channel encoders corresponding to the plurality of services and channel encoding the corresponding services; and a digital modulator corresponding to the plurality of services and performing digital modulation on the corresponding channel encoded services, and information on the plurality of services further includes information on the channel encoding levels of the plurality of services and on the modulation levels of the plurality of services.

According to an embodiment of the present invention, a broadcasting signal receiving device for receiving a frame from the outside and providing a plurality of services includes: a frame header determiner for determining whether to receive the frame according to a frame header of the frame; a fast Fourier transform unit for converting the frame determined allowable by the frame header determiner in the time domain into a frame in the frequency domain; a service selector for outputting at least one service of the frame in the frequency domain; a plurality of digital demodulators for performing digital demodulation on the at least one service; and a plurality of channel decoders for channel decoding the digitally demodulated at least one service.

The service selector senses the location of the at least one service from the frame header and outputs the at least one service. The digital demodulator senses information on the digital modulation level of the at least one service from the frame header, and performs digital demodulation on the at least one service. The channel decoder senses information on the channel encoding level of the at least one service from the frame header, and channel decodes the at least one service.

ADVANTAGEOUS EFFECTS

According to the present invention, a plurality of services can be multiplexed to the transmission frame in the frequency domain and the time domain, and the plurality of services can be transmitted in different formats. Also, a receiving device can selectively receive a desired service by using a frame header including information on each service.

BRIEF DESCRIPTION OF THE DRAWINGS

FIG. 6 shows a flowchart of a digital broadcasting signal receiving method according to an exemplary embodiment of the present invention.

MODE FOR THE INVENTION

Figure 1:
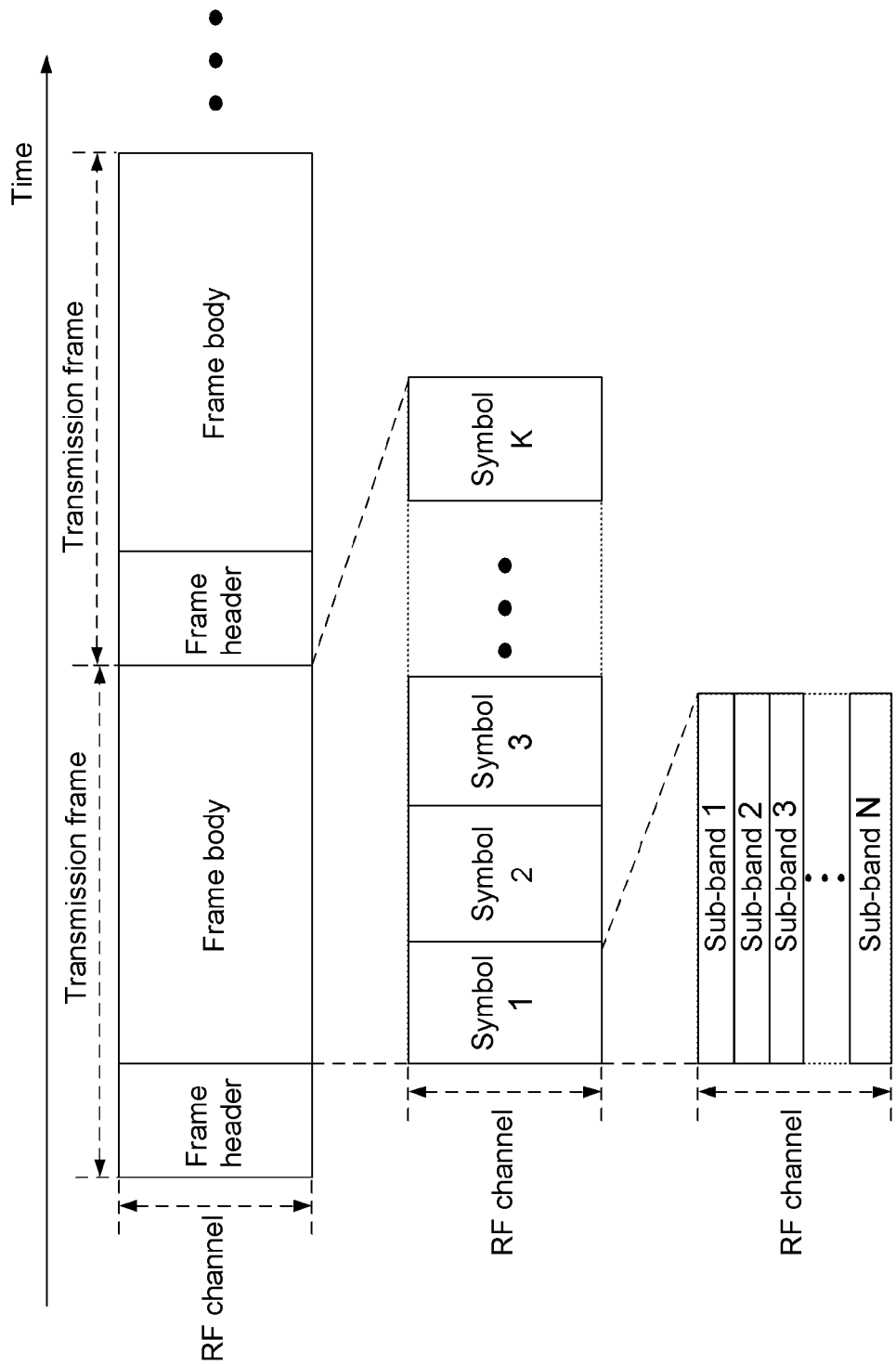
FIG. 1 shows a transmission frame configuration of a digital broadcasting signal transmission method according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise", and variations such as "comprises" and "comprising", will be understood to imply the inclusion of stated elements but not the exclusion of any other elements. In addition, the terms "-er", "-or", and "module" described in the specification mean units for processing at least one function and operation and can be implemented by hardware components or software components, and combinations thereof.

A digital broadcasting signal transmitting method and device, a recording medium, and a receiving device according to an exemplary embodiment of the present invention will now be described.

FIG. 1 shows a transmission frame configuration of a digital broadcasting signal transmission method according to an exemplary embodiment of the present invention.

As shown in FIG. 1, the transmission frame includes a frame header and a frame body.

The frame header is provided on the former part of the transmission frame, and includes information for indicating synchronization of the transmission frame, and information (hereinafter, service information) on the plurality of services multiplexed to the frame body. In this instance, the service information includes information on a transmission mode, a modulation level, layer modulation, and an error correction code. Also, the frame header is transmitted with a signal in the time domain so that a receiving device may quickly check information on the frame header.

The frame body is configured with a plurality of services to be transmitted through the transmission frame, it is divided into K orthogonal frequency division multiplex (OFDM) symbols (referred to as symbols hereinafter, i.e., shown as symbol 1, symbol 2, symbol 3, ..., symbol K in FIG. 1) in the time domain, and it is divided into N sub-bands (shown as sub-band 1, sub-band 2, sub-band 3, ..., sub-band N in FIG. 1) in the frequency domain. The plurality of services are respectively multiplexed in the time domain and the frequency domain by the K symbols and the N sub-bands. Also, the frame body that is divided into K symbols is transmitted with a signal in the frequency domain.

Figure 2:
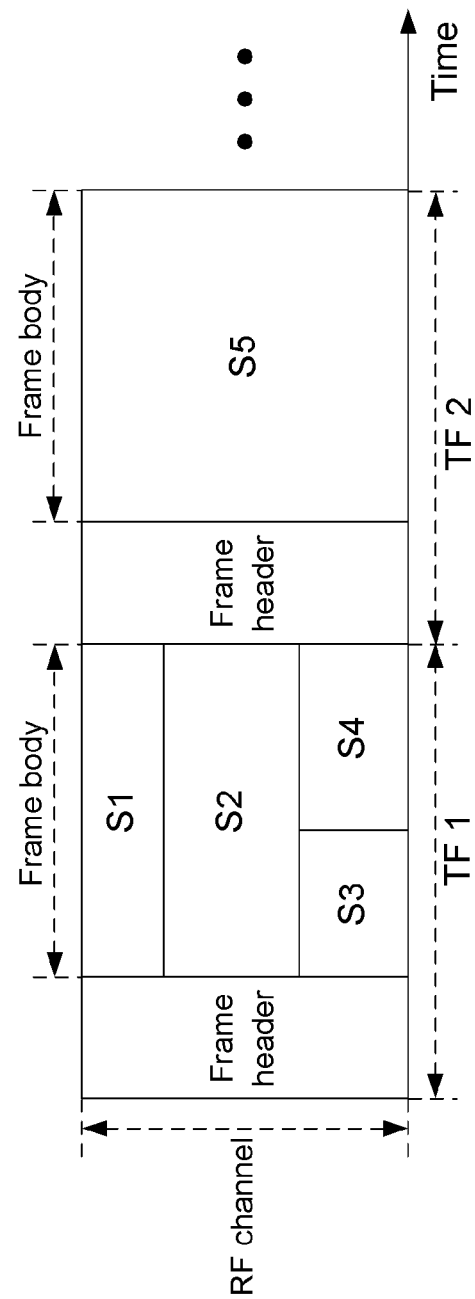
FIG. 2 shows a transmission frame according to an exemplary embodiment of the present invention.

FIG. 2 shows a transmission frame according to an exemplary embodiment of the present invention. It is assumed in FIG. 2 that the frame body of the transmission frames TF1 and TF2 is divided into N sub-bands in the frequency domain and the same is divided into K symbols in the time domain.

FIG. 2 shows a first service S1, a second service S2, a third service S3, a fourth service S4, and a fifth service S5 that are multiplexed to the first transmission frame TF 1 and the second transmission frame TF 2. Here, the first service S1, the second service S2, the third service S3, the fourth service S4, and the fifth service S5 represent contents in different formats for digital broadcasting. The amount of data transmission required for the plurality of services (S1-S5) depends on the service types. Also, the transmission mode, modulation level, layer modulation, and error correction code for the respective services are individually determined in order to apply the services to the receiving device with various structures.

First, the services (S1-S5) are multiplexed for the respective transmission frame by using size information of the services. That is, the first service S1 to the fourth service S4 are allocated to the first transmission frame TF1, and the fifth service S5 is allocated to the second transmission frame TF2.

As shown in FIG. 2, the frame body of the first transmission frame TF1 is divided into a first sub-band group, a second sub-band group, and a third sub-band group. In this instance, the first service S1 is allocated to the first sub-band group, the second service S2 is allocated to the second sub-band group, and the third service S3 and the fourth service S4 are allocated to the third sub-band group. The first sub-band group and the second sub-band group are located on the K symbols, and K symbols are divided into two parts in the third sub-band group so that the first part is allocated to the third service S3 and the second part is allocated to the fourth service S4.

That is, in the frame body of the first transmission frame TF1, the first service S1 is allocated to A sub-bands and K symbols, and the second service S2 is allocated to B sub-bands and K symbols. The third service S3 is allocated to C sub-bands and X symbols, and the fourth service S4 is allocated to C sub-bands and Y symbols. In this instance, the sum of A, B, and C (i.e., A+B+C) is the number N of the entire sub-bands, and the sum of X and Y (i.e., X+Y) is the number K of the entire symbols.

The first service S1 to the fourth service S4, which are low-capacity contents, are multiplexed in the time domain and the frequency domain and can be transmitted with a single transmission frame.

The second transmission frame TF2 and the fifth service S5, which are large-capacity contents, can be multiplexed to a single transmission frame TF2.

In this instance, the first service to the fourth service can be low-capacity contents that can be provided to a cellular phone, and the fifth service can be large-capacity contents that can be provided to a high definition (HD) television.

As described, according to the digital broadcasting signal transmission method according to the exemplary embodiment of the present invention, a plurality of different services with a low capacity can be multiplexed in the frequency domain and the time domain to be thus configured to a single transmission frame. Further, a single service with a high capacity can be configured to a single transmission frame.

In this instance, the transmission frame includes a frame header provided to the former part, and the frame header includes information on a plurality of services. Here, information on the plurality of services includes information on at least one sub-band and at least one symbol at which the plurality of services are located. Since the frame header is transmitted with the signal in the time domain, the receiving device checks information included in the frame header to selectively receive a desired transmission frame or selectively decode a desired service from the received transmission frame.

A digital broadcasting signal transmitting device and method according to an exemplary embodiment of the present invention will now be described.

Figure 3:
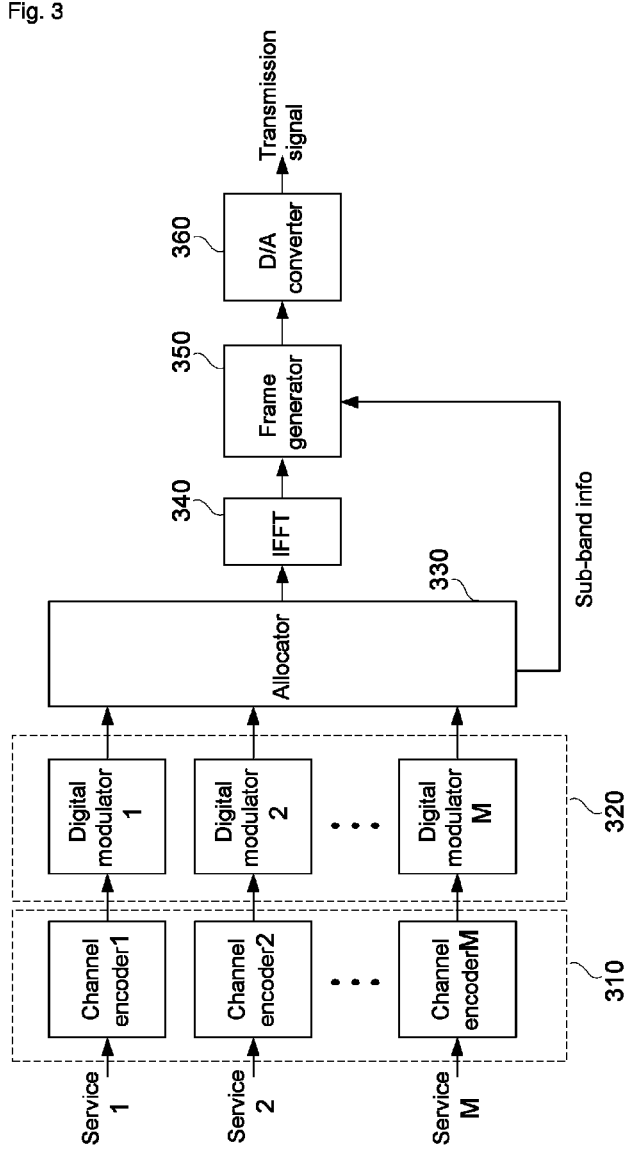
FIG. 3 shows a block diagram of a digital broadcasting signal transmitting device according to an exemplary embodiment of the present invention.
Figure 4:
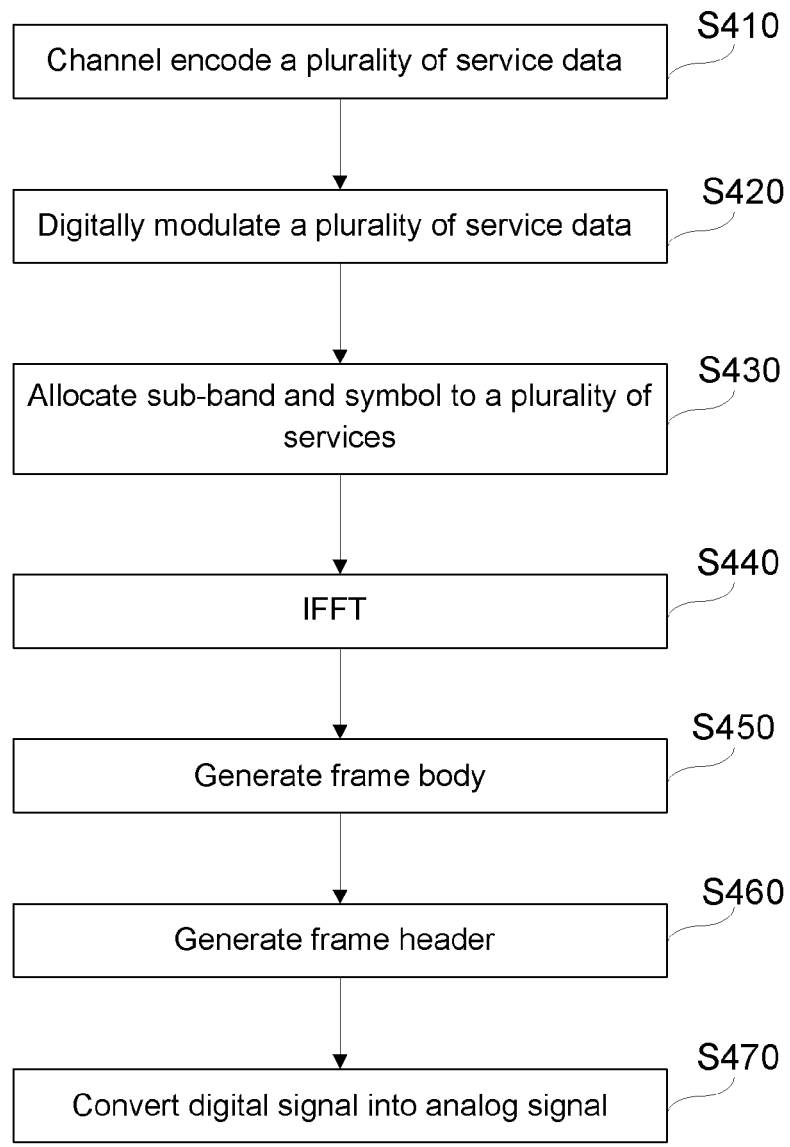
FIG. 4 shows a flowchart of a digital broadcasting signal transmitting method according to an exemplary embodiment of the present invention.

FIG. 3 shows a block diagram of a digital broadcasting signal transmitting device according to an exemplary embodiment of the present invention, and FIG. 4 shows a flowchart of a digital broadcasting signal transmitting method according to an exemplary embodiment of the present invention. FIG. 3 is a partial view of a digital broadcasting signal transmitting device according to an exemplary embodiment of the present invention.

As shown in FIG. 3, a transmitting device of the digital broadcasting signal according to an exemplary embodiment of the present invention includes M channel encoders 310, M digital modulators 320, an allocator 330, an inverse fast Fourier transform (IFFT) unit 340, a frame generator 350, and a digital/analog (D/A) converter 360.

The channel encoder 310 channel encodes digital data (hereinafter service data) for M services according to requirements of the corresponding services (S410). In this instance, the channel encoding method includes Reed-Solomon (RS) encoding, convolution encoding, lattice encoding, turbo encoding, low density parity check (LDPC) encoding, and concatenated encoding that has concatenated at least two encoding methods.

The M digital modulators 320 modulate channel encoded service data output by the M channel encoders 310 into digital signals (S420). Here, the digital modulation method includes quadrature phase shift keying (QPSK), differential QPSK (DQPSK), 16QAM, 32QAM, 64QAM, 128QAM, and 256QAM.

The allocator 330 allocates at least one sub-band and at least one symbol to digital service data output by the M digital modulators 320 (S430). Here, the allocator 330 generates information on the M service data, and applies the same to the frame generator 350. In this instance, information on the M services includes information on the location corresponding to each of the M services, information on the transmission mode, information on the channel encoding level, information on the digital modulation level, and information on the layer modulation level. Here, information on the M services represents information on at least one sub-band and at least one symbol allocated to the M services.

The IFFT unit 340 converts the signal in the frequency domain for the M service data output by the sub-band allocator 330 into a signal in the time domain (S440).

The frame generator 350 performs a time division multiplexing process on the signal in the time domain output by the IFFT unit 340 into transmission frames. That is, the frame generator 350 generates a plurality of symbol sections into a frame body of a transmission frame (S450).

The frame generator 350 generates a frame header including information on the M services (S460). In this instance, the frame header can have a structure for synchronization of the transmission frame or can include information on synchronization of the transmission frame.

The D/A converter 360 converts the transmission frame of the digital signal output by the frame generator 350 into an analog signal, and outputs the analog transmission frame to the receiving device (S470).

As described, according to the digital broadcasting signal transmitting device and method according to the exemplary embodiment of the present invention, at least one sub-band and at least one symbol are allocated to the M services. As a result, it is possible to configure a plurality of services that are multiplexed in the frequency domain and the time domain in the frame body of the transmission frame. Further, the frame header including information on at least one service is configured in the frame body, the frame header is transmitted with the signal in the time domain, the frame header of the transmission frame is generated after at least one service is configured, and information on the sub-band and the symbol at which the services are located can be configured in the frame header.

A digital broadcasting signal receiving device and method according to an exemplary embodiment of the present invention will now be described.

Figure 5:
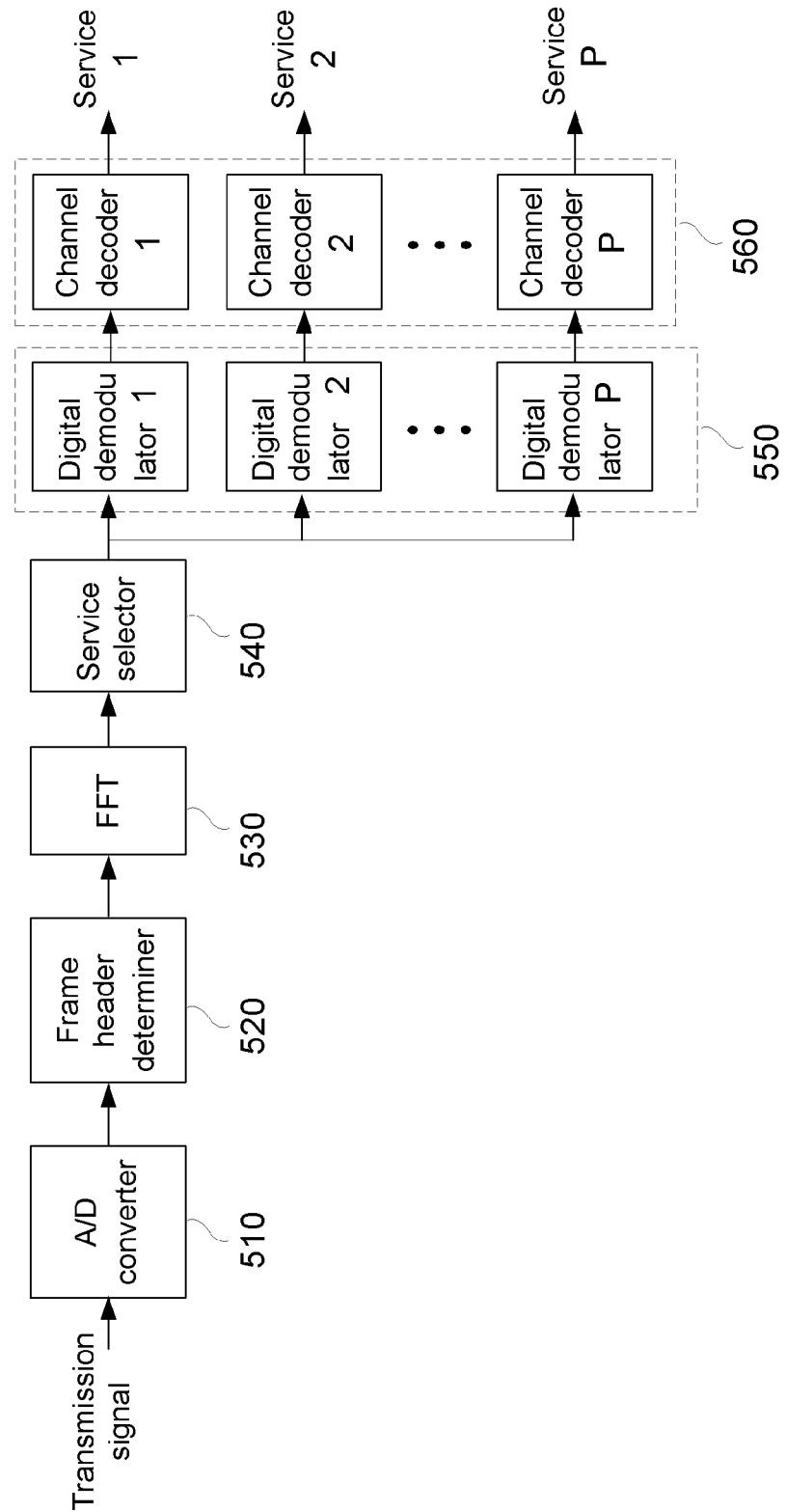
FIG. 5 shows a block diagram of a digital broadcasting signal receiving device according to an exemplary embodiment of the present invention.

FIG. 5 shows a block diagram of a digital broadcasting signal receiving device according to an exemplary embodiment of the present invention, and FIG. 6 shows a flowchart of a digital broadcasting signal receiving method according to an exemplary embodiment of the present invention. FIG. 5 is a partial view of a digital broadcasting signal receiving device according to an exemplary embodiment of the present invention.

As shown in FIG. 5, the digital broadcasting signal receiving device includes an analog/digital (A/D) converter 510, a frame header determiner 520, a fast Fourier transform (FFT) unit 530, a service selector 540, P digital demodulators 550, and P channel decoders 560.

The A/D converter 510 converts the received analog signal into a digital signal (S610).

The frame header determiner 520 senses the structure or information for indicating synchronization of the transmission frame from the digital signal output by the A/D converter 510, checks the location of the frame header, and determines information configured in the frame header (S620).

In this instance, the frame header determiner 520 does not apply the corresponding transmission frame to the FFT unit 530 when all the services configured in the frame body of the corresponding transmission frame are inapplicable to the receiving device.

The frame header determiner 520 applies the corresponding transmission frame to the FFT unit 530 when at least one service configured in the frame body of the corresponding transmission frame is applicable to the receiving device.

The FFT unit 530 converts the transmission frame in the time domain into a signal in the frequency domain (S640).

The service selector 540 selects at least one service to be provided by the receiving device from the transmission frame in the frequency domain output by the FFT unit 530 (S650). In this instance, the service selector 540 senses the sub-band and symbol section at which the selected service is located by using information on the service configured in the frame header. Also, the service selector 540 outputs the selected at least one service for each service. The service selector 540 will be assumed to output P services.

The P digital demodulators 550 perform a digital demodulation process on the P services output by the service selector 540 by using information on the modulation levels of the P services included in the frame header.

The P channel decoder 560 performs a channel decoding process on the digitally demodulated services output by the P digital demodulators 550 by using information on the channel encoding levels of the P services included in the frame header (S670).

As described, the digital broadcasting signal receiving method and device according to the exemplary embodiment of the present invention receives the transmission frame including a plurality of services multiplexed in the frequency and the time domain, and uses information configured in the frame header to selectively receive the service using the receiving device.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method of transmitting a broadcasting signal in a broadcasting signal transmitting device, the method comprising:

channel encoding each of a plurality of service data;
allocating at least one sub-band and at least one symbol of a frame to each of the plurality of service data;
generating a frame header including information on each of the plurality of service data; and
inserting the frame header into the frame,
wherein the frame further includes a frame body including the plurality of service data, and
the frame header including the information on the plurality of service data is located prior to the frame body, and
wherein the information on each of the plurality of service data includes information on the sub-band and the symbol allocated to each of the plurality of service data and information on channel encoding level of each of the plurality of service data.

2. The method of claim 1, further comprising modulating each of the plurality of service data,
wherein the information on each of the plurality of service data further includes information on modulation level of each of the plurality of service data.

3. A method of transmitting a broadcasting signal in a broadcasting signal transmitting device, the method comprising:

channel encoding each of the plurality of service data,
allocating at least one sub-band and at least one symbol of a frame to each of the plurality of service data;
transforming the frame into a frame of a time domain;
generating a frame header including information required for decoding the frame; and
inserting the frame header into the frame of the time domain,
wherein the frame further includes a frame body including the plurality of service data, and
the frame header including the information on the plurality of service data is located prior to the frame body, and
wherein the information on each of the plurality of service data includes information on the sub-band and the symbol allocated to each of the plurality of service data and information on channel encoding level of each of the plurality of service data.

* * * * *